R. LATCHAM.
ANTIFRICTION SHAPER COLLAR.
APPLICATION FILED FEB. 25, 1909.
947,079.
Patented Jan. 18, 1910.
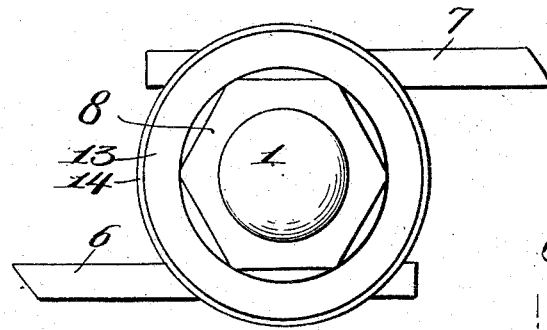
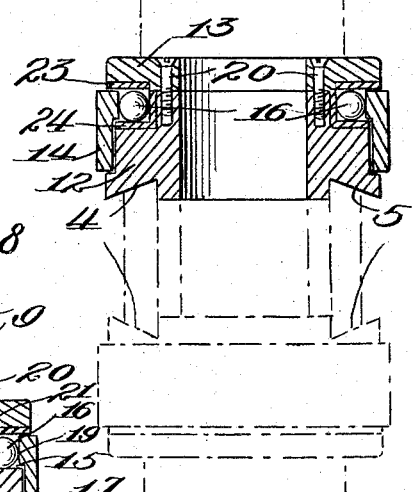
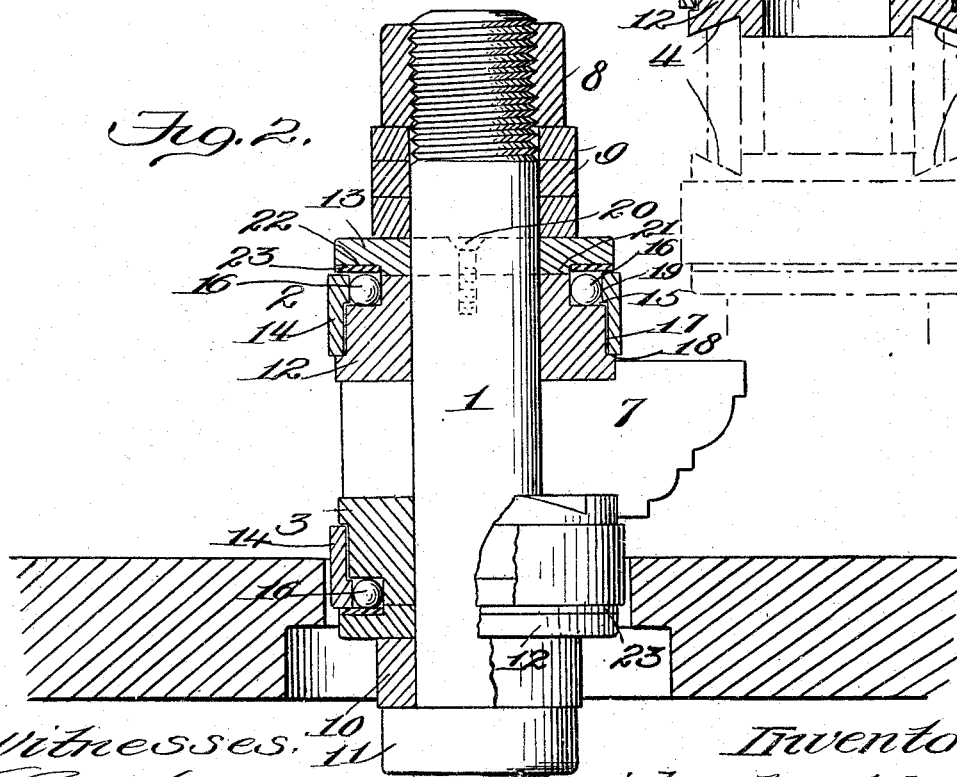
Witnesses:
Inventor
Richard Latcham
By James R. Norris
Atty.

UNITED STATES PATENT OFFICE.

RICHARD LATCHAM, OF SCRANTON, PENNSYLVANIA, ASSIGNOR OF ONE-HALF TO ARTHUR E. SWEET, OF SCRANTON, PENNSYLVANIA.

ANTIFRICTION SHAPER-COLLAR.

947,079.

Specification of Letters Patent. Patented Jan. 18, 1910.

Application filed February 25, 1909. Serial No. 480,034.

*To all whom it may concern:*

Be it known that I, RICHARD LATCHAM, a citizen of the United States, residing at Scranton, in the county of Lackawanna and State of Pennsylvania, have invented new and useful Improvements in Antifriction Shaper-Collars, of which the following is a specification.

My present invention has for its object to provide a novel and improved ball-bearing collar for the spindle cutter heads of wood shapers whereby the molding or other wood which bears against such collar will not be burned, marred, or injured in any way, especially when hard wood is being handled, the collar having a rolling engagement with the edge of the molding or other material and the spindle revolving within the collar, the especial purpose of the present invention being to provide an improved bearing for such collars which bearing is provided with a race-way for the balls which race-way is composed of an anti-friction metal that will prevent heating of the bearing owing to the high speed of the spindle, and such raceways moreover are mounted loosely within the bearing so that they may be readily refitted or renewed when necessary, the bearing being constructed in an improved manner whereby the same shall be dustproof.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a plan view of a shaper head equipped with a ball-bearing collar constructed in accordance with my present invention; Fig. 2 represents a vertical section of a pair of shaper heads having the ball-bearing collars fitted thereon; and Fig. 3 is a sectional view of a bearing wherein the entire race-way for the balls is formed separately from the shaper head and is capable of being refitted or renewed when necessary or desirable.

Similar parts are designated by the same reference characters in the several views.

In the accompanying drawing, I have shown certain embodiments of the invention as applied to the shaper heads of woodworking machines, and the invention is especially advantageous when so applied. It will be understood, however, that the drawing shows certain forms of the invention as examples and that modifications or changes might be made in the detail construction or the arrangement of the parts without departing from the spirit of the invention.

In the present instance 1 designates the spindle of the shaper on which are fitted a pair of upper and lower shaper heads 2 and 3. These heads are removably fitted over the upper end of the spindle and are arranged in reverse relation thereon, the proximate faces of the two shaper heads being provided with complemental beveled recesses 4 and 5 which extend tangentially of the axis of the spindle and at opposite sides thereof so as to receive the knives 6 and 7 the cutting edges of which usually project from opposite sides of the cutter as shown in Fig. 1. These knives have correspondingly beveled upper and lower edges to fit the beveled recesses formed in the opposed faces of the shaper heads, and such knives are firmly clamped in the proper adjusted positions by means of a nut 8 which is threaded upon the upper end of the spindle and is movable axially thereon. A suitable number of washers 9 are interposed between the upper shaper head 2 and the nut, and a similar washer 10 may be interposed between the lower shaper head and the fixed collar or shoulder 11 on the spindle, and a tightening of the nut 8 will, obviously, produce a clamping of the knives between the two heads. These cutter heads in the present instance are duplicates, and a specific description of the ball-bearing collar will be sufficient for both. Each shaper head consists in the present instance of a body portion 12, a complemental disk or plate 13 and a collar 14 which is mounted on the head by an anti-friction bearing of a novel construction whereby this collar may have a rolling engagement with the molding without friction and the spindle with the shaper head thereon will revolve easily within the collar.

The body portion 12 of the shaper head is formed with an annular recess 15 adjacent to that face thereof which is engaged by the disk 13 so as to receive an annular row of balls 16 which, in that form of the invention shown in Fig. 2, directly engage two walls of the recess 15. The periphery of the body portion 12 of the shaper head is also formed with an annular groove 17. The collar 14 surrounds the periphery of the body portion 12 and one of its ends fits closely against the circular shoulder 18 formed at one end of the peripheral groove 17, the opposite end of the collar having an inwardly projecting flange 19 which extends into the recess 15 and has a bearing against the annular row of balls 16. The disk 13 is preferably detachably secured to the body portion of the head in order that the bearing for the collar may be accessible, a pair of screws 20 extending through the exposed face of this disk in the present instance and are tapped into the body portion 12. This disk 13 has a central shoulder 21 thereon which is clamped down firmly against the opposed face of the body portion 12, an annular groove 22 surrounding this shoulder and forming a seat for a bearing and thrust ring 23, the latter being preferably formed of brass, bronze or other appropriate anti-friction metal and serving as a raceway for the annular row of balls 16, this ring being loosely mounted in the groove 22 so that it may turn relatively to the disk 13. This ring is removable so that it may be refitted or replaced when worn, and its peripheral edge is preferably flush with the periphery of the disk 13 and it fits closely against the adjacent edge of the collar 14. This ring 23 therefore serves the dual function of a removable raceway for the annular row of ball bearings and it also receives the thrust of the collar 14 and as it is composed of anti-friction metal, the incidental friction between this ring and the collar will not cause heating of the bearing owing to the high speed of the spindle. By fitting this ring closely against the collar 14 and causing the opposite edge of the latter to closely engage the circular shoulder 18 on the shaper head, a dustproof bearing is provided so that the cuttings from the molding cannot enter and clog the bearing. As the central shoulder 21 of the disk 13 has a solid or firm engagement with the corresponding portion of the head 12, the adjustment of the bearing is not disturbed in the least although a considerable pressure may be exerted upon the shaper head due to the tightening of the nut 8.

In Fig. 3 I have shown another form of the bearing for the collar wherein the annular recess 15 in the body portion 12 of the head is formed deeper than in Fig. 2, and a renewable race-way 24 is fitted into such recess, this race-way having a substantially right angular cross section. The anti-friction ring 23 is also used as in the previous construction, and a bearing formed in this manner is capable of being readily renewed and by forming the race-way of brass, bronze or other anti-friction metal separately from the steel or other material from which the shaper head is usually constructed, the maximum life is insured for the bearing and heating is avoided. In Fig. 3, the two elements of the race-way are retained in proper position by the tightening of the disk 13, and should it be necessary to renew any of the parts, the annular row of balls may be removed from the shaper head bodily, they remaining upon the angularly shaped race-way 24 which is removable from the shaper head.

By fitting both the upper and lower shaper heads with anti-friction collars in the manner described, the molding or other material being operated upon by the knives may have a rolling engagement with either one or both of these collars, and although the spindle revolves at a high speed within the collars, there is no slippage between the collars and the molding which would cause burning, marring or other injury thereto. The bearing is simple and inexpensive in its construction and is subject to a minimum wear, and these features especially adapt the invention to shaper heads owing to the fact that the spindles revolve at high speed and provision has been made to exclude dust or other material from the bearings. Moreover, by interposing the annular row of balls or anti-friction devices between the inner cylindrical circumference of the internal flange of the collar and the body portion of the head, a single row of balls or rollers may be used, such balls or rollers sustaining all pressure exerted against the periphery of the collar, and any slight axial thrust as may be produced between the collar and the head will be sustained by the interposed ring of anti-friction material.

I claim as my invention:

1. A shaper head comprising a body portion provided with an annular recess toward one end, a single annular row of balls mounted in said recess, a collar revolubly mounted on said body portion and having an internal flange the inner circumference of which projects into said recess and forms a race-way engaging said balls, a disk having a central annular shoulder clamped firmly against the body portion, said shouldered disk having an annular groove opposite to said annular recess of the body portion, and an anti-friction ring loosely mounted in the annular groove of said disk and centered by the central annular shoulder thereof, the outer edge of said anti-friction ring loosely engaging said disk and the flange of said collar and its inner portion engaging said balls as a race-way.

2. A shaper head comprising a body portion provided with an annular recess one side of which is open at one end of the head, a renewable anti-friction lining fitted in said recess, the lining having a cylindrical portion to engage the inner wall of the recess, and an integrally formed flat portion fitting against an adjacent wall of the recess, an annular row of balls mounted in said anti-friction lining, a collar revolubly fitted on the body portion of the head and having an internal flange the inner circumference of which projects into said recess of the head and coöperates as a race-way with said balls, a disk having a central annular shoulder clamped firmly against the end of the body portion adjacent to the recess therein, and an anti-friction thrust ring loosely surrounding and centered by the central annular shoulder of the disk, said anti-friction thrust ring having its outer portion loosely engaging the disk and collar and its inner portion forming an anti-friction race-way for said row of balls.

In testimony whereof I have hereunto set my hand in presence of two subscribing witnesses.

RICHARD LATCHAM.

Witnesses:
W. H. WILLIAMS,
EDGAR A. JONES.